(12) United States Patent
Schlenk et al.

(10) Patent No.: US 9,161,399 B2
(45) Date of Patent: Oct. 13, 2015

(54) PROGRAMMABLE CURRENT SOURCE FOR LIGHT EMITTING DIODE ARRANGEMENTS

(75) Inventors: Manfred Schlenk, Augsburg (DE); Masaya Yamashita, Nagano (JP)

(73) Assignee: Minebea Co., Ltd., Nagano-ken (JP)

( * ) Notice: Subject to any disclaimer, the term of this patent is extended or adjusted under 35 U.S.C. 154(b) by 871 days.

(21) Appl. No.: 13/349,880

(22) Filed: Jan. 13, 2012

(65) Prior Publication Data

US 2012/0181949 A1  Jul. 19, 2012

(30) Foreign Application Priority Data

Jan. 19, 2011 (DE) .......................... 10 2011 008 937

(51) Int. Cl.
*H05B 37/00* (2006.01)
*H05B 39/00* (2006.01)
*H05B 41/00* (2006.01)
*H05B 33/08* (2006.01)

(52) U.S. Cl.
CPC ........ *H05B 33/0809* (2013.01); *H05B 33/0821* (2013.01)

(58) Field of Classification Search
None
See application file for complete search history.

(56) References Cited

U.S. PATENT DOCUMENTS

| 5,629,587 | A | 5/1997 | Gray et al. |
| 2007/0120505 | A1* | 5/2007 | Moriyasu et al. ............. 315/309 |
| 2008/0116818 | A1 | 5/2008 | Shteynberg et al. |
| 2010/0091807 | A1* | 4/2010 | Deppe et al. ............... 372/38.04 |
| 2010/0289430 | A1 | 11/2010 | Stelzer et al. |

FOREIGN PATENT DOCUMENTS

| WO | 2008/051386 A2 | 5/2008 |
| WO | 2010/031169 A1 | 3/2010 |
| WO | 2010/056112 A1 | 5/2010 |
| WO | WO 2010056112 A1 * | 5/2010 |

* cited by examiner

*Primary Examiner* — Anh Tran
(74) *Attorney, Agent, or Firm* — Volpe and Koenig, P.C.

(57) ABSTRACT

An adjustable power supply (1) for light emitting diode arrangements (11), with the power supply (1) being dimensioned for a power class. The power supply (1) has an adjustable current source (3) and an adjustable power limitation (4), and the power limitation (4) is adjustable within the limits of the power class. The power supply (1) further has a control component (5) that is suitable for running an operating program (8). This operating program (8) uses, as its input parameters (7), the number of light emitting diodes (13) to be controlled and their method of connection and, from these parameters, it calculates the required current and the required power, according to which the current source (3) and the power limitation (4) are adjusted and regulated.

9 Claims, 2 Drawing Sheets

PROGRAMMABLE CURRENT SOURCE FOR LIGHT EMITTING DIODE ARRANGEMENTS

CROSS-REFERENCE TO RELATED APPLICATION

This application claims the benefit of German Patent Application No. 10 2011 008 937.3, filed Jan. 19, 2011, which is incorporated herein by reference as if fully set forth.

BACKGROUND

The invention describes a power supply for light emitting diode arrangements having a current source.

Previously, light emitting diodes were mainly used individually as a signal or a status indicator. Through advances in the manufacture of light emitting diodes, however, new areas of application have been constantly developed. Hence, the use of light emitting diodes for illumination purposes has become increasingly widespread. In the meantime, light emitting diodes are already being used in the place of light bulbs and fluorescent lamps for both general and specific illumination purposes, including large-area lighting.

In these applications, a plurality of light emitting diodes are usually combined to form a light emitting diode arrangement, the individual light emitting diodes being connected in parallel and/or in series.

For practically every application and in every device, the number, power and connecting method of the light emitting diodes within the light emitting diode arrangement differs. This means that each device needs a special power supply adapted to the light emitting diode arrangement. Since there is an almost infinite variety of possible configurations for light emitting diode arrangements, this becomes highly complex and cost intensive.

SUMMARY

It is thus the object of the invention to create a power supply that can be used for a variety of different light emitting diode arrangements.

This objective has been achieved according to the invention in that the power supply is dimensioned for a power class and has an adjustable current source and an adjustable power limitation, where the power limitation can be adjusted within the limits of the power class, that the power supply has a control component for controlling the current source and the power limitation, and that the control component is designed to run an operating program whose input parameters are the number of light emitting diodes to be controlled and the manner in which they are connected and, in accordance with this input, the current intensity of the current source and the power limitation are controlled.

The power supply according to the invention can thereby be adapted to all applications within a power class. The advantage here is that within an individual power class, only one single power supply according to the invention is now necessary, which can be adapted to every device having a light emitting diode arrangement.

The power supply is adapted to the light emitting diode arrangement through the transfer of input parameters to a control component of the power supply. These input parameters substantially comprise the number of individual light emitting diodes in the light emitting diode arrangement and their method of connection. In other words, how many light emitting diodes are connected in parallel and/or in series.

In addition, the nominal current and/or the power consumption of the individual light emitting diodes, for example, are needed as input parameters. From these input parameters, the current needed to operate the light emitting diode arrangement and the required power are determined by the operating program of the control component. The current source and the power limitation of the power supply is adjusted and regulated in accordance with these values.

In order to keep power loss and costs low, the power supply according to the invention is designed for one power class. This means that the power limitation can only be adjusted within the limits of the predetermined power class, for example, between 30 W and 60 W, between 10 W and 20 W, between 60 W and 100 W or between any other meaningful pairs of values.

The advantage here is that the power supply can be adapted to the light emitting diode arrangement to be controlled by the end user without the need for any profound knowledge of the fundamentals of electronics. The user, such as a lamp manufacturer, can design a lamp having a light emitting diode arrangement, for example, and adapt the necessary power supply himself. For a short-term change in the light emitting diode arrangement, for example, in the number of light emitting diodes or their method of connection, there is no need for a different power supply, provided there is no departure from the power class of the power supply. Re-configuration by changing the input parameters is all that is required.

The control component is preferably a microcontroller, since they are inexpensive and can be easily provided with the operating program. The control component may, however, also have an ASIC, an FPGA, a PIC or any other similarly programmable component.

The input parameters are preferably stored in a read-only memory from which they are loaded onto the main memory when the operating program is started. It is particularly expedient if the read-only memory is non-volatile so that the parameters are maintained even without any operating voltage.

The power supply may, for example, have input devices that make it possible to change the input parameters directly at the power supply.

It is preferable, however, if the input parameters can be adjusted or changed using an external control unit that can be connected to the power supply. This can be effected, for example, via an interface of the control component. Here it is basically possible for the input parameters themselves to be stored in the read-only memory and/or that from these input parameters, other parameters needed for the operating program are calculated in the control unit and these parameters are alternatively or additionally stored in the read-only memory.

The external control unit may, for example, be a computer which allows a graphical or a dialog-supported configuration to be carried out. The control unit may of course also have discrete control elements, such as switches.

In addition to the adjustable power limitation, the power supply can have an adjustable voltage limitation, so that in case of an error or a defect in the light emitting diode arrangement, the voltage does not rise to an undesirable extent thus destroying the light emitting diodes or other parts of the power supply.

In an advantageous development on the invention, the power supply has a dimming device which allows the brightness of the light emitting diode arrangement to be arbitrarily changed up to an adjustable maximum value. Here, the brightness and/or the dimming characteristic may be an additional input parameter of the operating program adjustable by the end user.

The invention furthermore describes a method for operating a power supply. In an operating program of a control component, the required current and the required power is calculated from the number of light emitting diodes and their method of connection in a light emitting diode arrangement as input parameters, and the current source and the power limitation are adjusted to these values accordingly.

The input parameters are preferably entered via a menu using an external control unit that can be connected to the power supply.

BRIEF DESCRIPTION OF THE DRAWINGS

The invention is described in more detail below with reference to the enclosed drawings.

In the drawings.

DETAILED DESCRIPTION OF THE PREFERRED EMBODIMENTS

Figure 1:
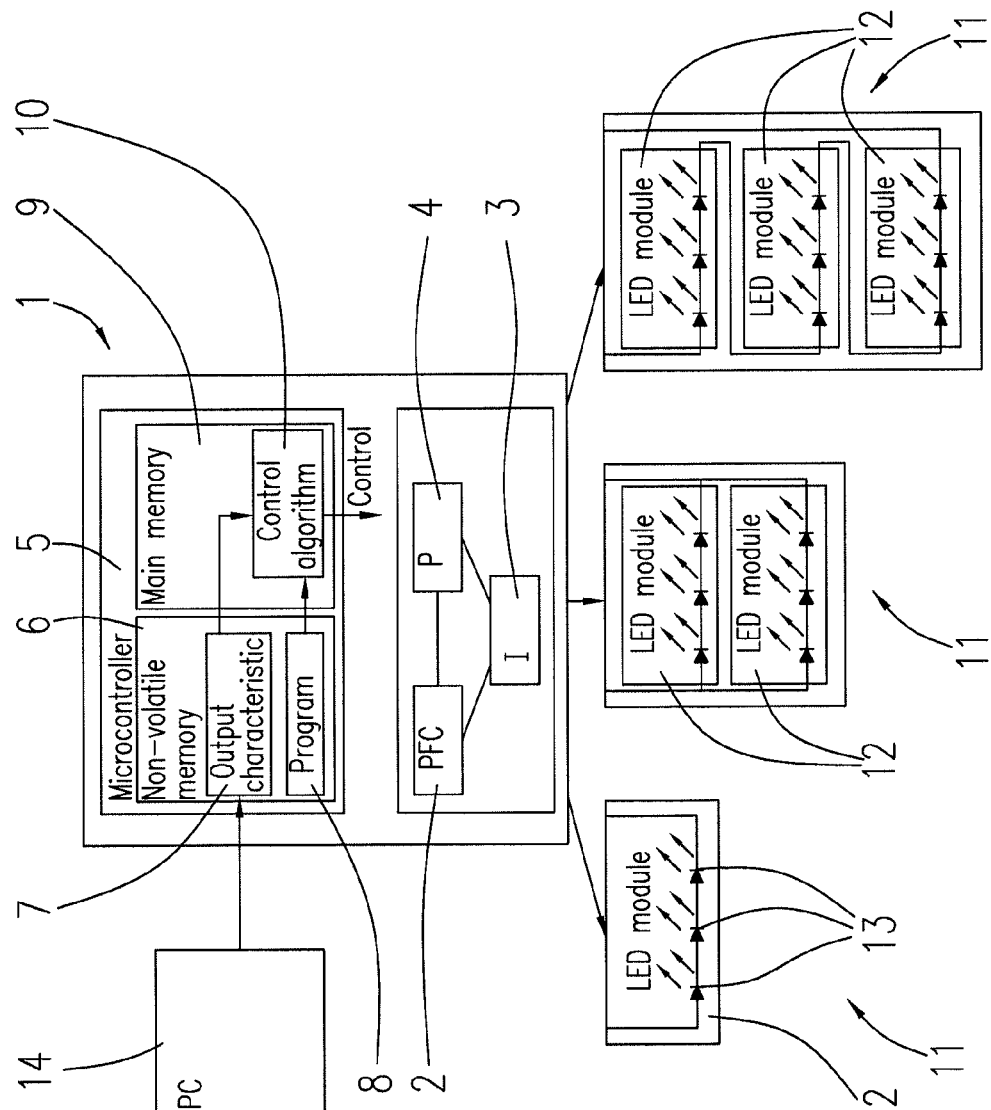
FIG. 1 is a schematic view of a power supply according to the invention having various possible light emitting diode arrangements and FIG. 2a-2d is an example of menu-driven programming of the input parameters via an external computer.

FIG. 1 schematically shows an exemplary embodiment of a power supply 1 according to the invention that has a power factor correction 2, an adjustable direct current source 3, an adjustable power limitation 4 and a control component 5 for controlling the individual components. The power supply 1 is designed such that the adjustable power lies within a power class, i.e. the power is only adjustable within the limits of the power class. For example, the power supply has an adjustable output of between 30 W and 60 W. If, for an application, a lower or higher output is required, a power supply of a different, appropriate power class has to be used. Power factor correction may not be necessary for a lower output.

The exact design of the individual components does not play an important part for the invention, which is why the power factor correction 2, the current source 3 and the power limitation 4 are not described in more detail. These components are known from the prior art in a variety of different designs, so that a design suitable for the respective application can be easily found.

In the example, the control component 5 of the power supply 1 is designed as a microcontroller. The microcontroller 5 has a non-volatile memory 6 in which the input parameters 7 and the operating program 8 are stored. When the power supply is switched on, the operating program 8 and the input parameters 7 are loaded onto the main memory 9, where the operating program 8 is run.

The operating program 8 has a control algorithm 10 which, using the input parameters 7, allows the operating parameters for controlling the current source 3 and the power limitation 4 and any other components to be calculated.

On the left in the example, a light emitting diode arrangement 11 having a light emitting diode module (LED module) 12 is shown in which three individual light emitting diodes 13 are connected in series. In this case, the input parameters 7 would be the number three and connection in series. Alternatively, the LED module 12 could also be considered to be the smallest unit. In this case, the number would be set at one and the method of connection would be of no importance.

Using these input parameters 7, the microcontroller 5 calculates the required current and the required power. The controller may also need the power consumption and the current of the individual light emitting diodes 13 or of the LED module 12 as additional input parameters.

The current source 3 of the power supply 1 is then adjusted to the required current, the voltage being appropriately regulated so as to generate this current. Furthermore, the power limitation 4 is adjusted so that the overall voltage is not set too high.

If, in the light emitting diode arrangement 11, a second identical LED module 12 is connected in parallel to the first module, as indicated by the light emitting diode arrangement 11 in the middle, only this module 12 needs to be additionally entered. The input parameters 7 would then be two and connection in parallel. The required voltage is not changed by this, but the current and thus the power as well have to be doubled.

The situation is different for the light emitting diode arrangement 11 on the right having three identical LED modules 12 connected in series. The parameters would then be three and series connection. The current remains the same in relation to the arrangement 11 on the left, but the required voltage increases threefold, whereby the power consumption is tripled.

In the prior art, an own power supply would have to be designed for each of these light emitting diode arrangements 11. Thanks to the invention, all this is now made possible using only one power supply, provided that there is no departure from the power class.

Another advantage lies in the fact that the power supply 1 according to the invention can be easily adjusted by the end user to suit the light emitting diode arrangement to be controlled.

The input parameters 7 are changed, for example, using an external control unit 14 that is realized in the example as a program on a computer.

FIGS. 2a to 2d show by way of example how the input parameters of the power supply can be configured using this external computer 14.

For this purpose, the computer 14 is connected to an interface of the power supply and a menu-driven configuration program is run on the computer. In a first step (FIG. 2a), for example, the connection method of the light emitting diodes to be controlled is selected. Here, both individual light emitting diodes as well as LED modules having a plurality of light emitting diodes can be deemed the smallest unit. The description below uses LED modules as its basis, where the number of light emitting diodes in the module could also be one.

Figure 2B:
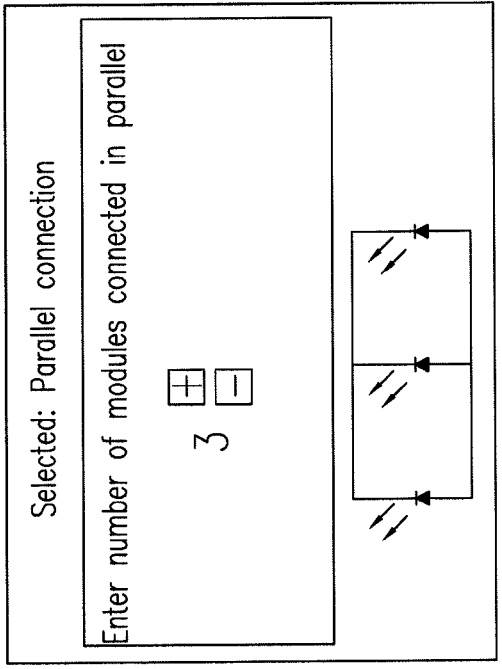
Figure 2A:
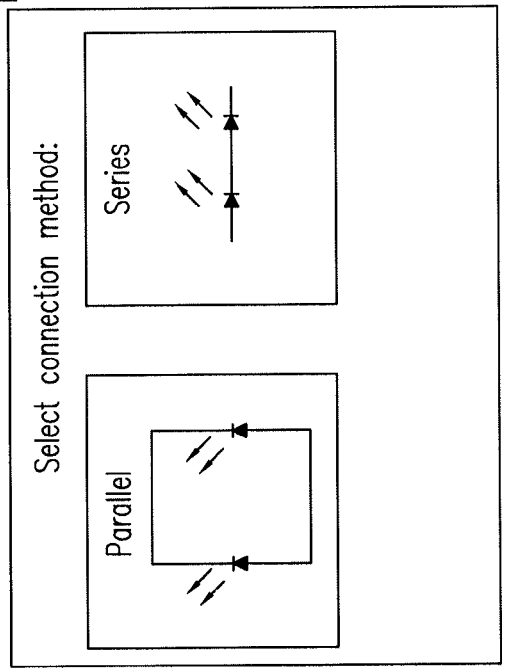
Figure 2D:
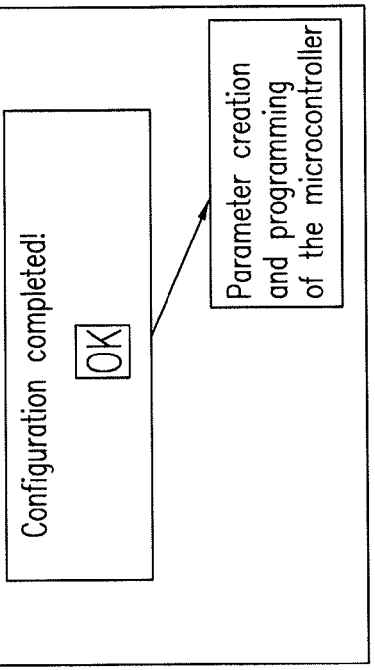

After this, the number of LED modules to be controlled is selected (FIG. 2b). In the example, connection in parallel of 3 LED modules has been selected. A symbol graph indicates the circuit, where, for the sake of simplicity, individual light emitting diodes also represent the LED modules in the example.

Figure 2C:
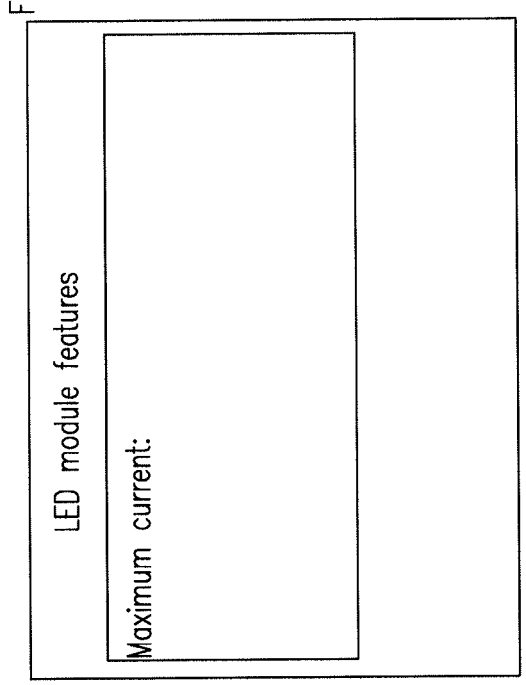

In a further step, the maximum power or current consumption of the LED modules is entered (FIG. 2c).

In a final step (FIG. 2d) the setting can be accepted and transmitted to the power supply.

The input parameters can be programmed in many other ways as well. The invention is therefore in no way restricted to the illustrated example.

In the operating program 8 of the power supply 1, the required current intensity and the required power are determined from these input parameters according to an algorithm. The current source 3 and the power limitation 4 are adjusted in accordance with these parameters.

IDENTIFICATION REFERENCE LIST

1 Power supply
2 Power factor correction
3 Current source
4 Power limitation
5 Control component
6 Non-volatile memory
7 Input parameter
8 Operating program
9 Main memory
10 Control algorithm
11 Light emitting diode arrangement
12 LED module
13 Light emitting diode
14 Control unit

The invention claimed is:

1. A power supply for light emitting diode arrangements (11) having a current source (3), comprising: the power supply (1) being dimensioned for a power class and comprises an adjustable current source (3) and an adjustable power limitation (4), the power limitation (4) is adjustable within limits of the power class, a control component (5) for controlling the current source (3) and the power limitation (4), the control component (5) is adapted to run an operating program (8) whose input parameters (7) are a number of light emitting diodes to be controlled and a method of connection for the light emitting diodes and, based on the input parameters, the control component is adapted to adjust and regulate a current intensity of the current source (3) and the power limitation (4).

2. A power supply according to claim 1, wherein the control component is a microcontroller (5).

3. A power supply according to claim 1, wherein the input parameters (7) are stored in a non-volatile memory (6) and, upon starting of the operating program (8), the input parameters (7) are loaded onto a main memory (9).

4. A power supply according to claim 1, wherein the input parameters (7) are adjustable or changeable using an external control unit (14) that is connectable to the power supply (1).

5. A power supply according to claim 1, wherein a further input parameter (7) of the operating program (8) is a maximum power consumption of one of the light emitting diodes.

6. A power supply according to claim 1, wherein the power supply (1) has an adjustable voltage limitation.

7. A power supply according to claim 1, wherein the power supply (1) has a dimming device which allows a brightness of the light emitting diode arrangement (11) to be arbitrarily changed up to an adjustable maximum value.

8. A method for operating a power supply according to claim 1, wherein a required current and a required power are calculated from the input parameters of the number of light emitting diodes and the method of connection, and the current source (3) and the power limitation (4) are adjusted and regulated according to these values.

9. A method according to claim 8, wherein the input parameters are entered via a menu using an external control unit (14) that can be connected to the power supply.

* * * * *